(12) United States Patent
Kim

(10) Patent No.: US 10,641,225 B2
(45) Date of Patent: May 5, 2020

(54) MOTOR ASSEMBLY FOR STARTING ENGINE AND DRIVING BALANCE SHAFT AND METHOD OF CONTROLLING THE SAME

(71) Applicants: HYUNDAI MOTOR COMPANY, Seoul (KR); KIA MOTORS CORPORATION, Seoul (KR)

(72) Inventor: Dae-Woon Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/100,380

(22) Filed: Aug. 10, 2018

(65) Prior Publication Data
US 2018/0347529 A1 Dec. 6, 2018

Related U.S. Application Data

(62) Division of application No. 15/228,033, filed on Aug. 4, 2016, now Pat. No. 10,082,119.

(30) Foreign Application Priority Data

Oct. 12, 2015 (KR) .................. 10-2015-0142156

(51) Int. Cl.
*F02N 11/00* (2006.01)
*F02N 11/08* (2006.01)
(Continued)

(52) U.S. Cl.
CPC ............ *F02N 11/003* (2013.01); *F02N 11/02* (2013.01); *F02N 11/0803* (2013.01);
(Continued)

(58) Field of Classification Search
CPC ........ F02N 11/00; F02N 11/003; F02N 11/02; F02N 11/0803; F02N 11/0814; F02N 11/0848; F02N 11/0851; F02N 15/022; F02N 15/06; F02N 15/062; F02N 15/067; F16F 15/264
(Continued)

(56) References Cited

U.S. PATENT DOCUMENTS 4,953,414 A * 9/1990 Ueno ...................... F02N 15/00
290/38 C
4,958,530 A * 9/1990 Jaseck .................... F02N 15/00
74/7 A
(Continued)

FOREIGN PATENT DOCUMENTS

JP S63-101539 A 5/1988
JP H03-14943 A 1/1991
(Continued)

*Primary Examiner* — John Kwon
*Assistant Examiner* — Johnny H Hoang
(74) *Attorney, Agent, or Firm* — Brinks Gilson & Lione

(57) ABSTRACT

A method of controlling a motor assembly for starting an engine and driving a balance shaft includes: determining whether starting or restarting of an engine is desired; operating an actuator such that a motor shaft is moved forward when the starting or restarting of the engine is desired; and starting or restarting the engine by rotating a motor and by driving a start gear, after the operating the actuator.

3 Claims, 5 Drawing Sheets

(51) Int. Cl.
*F02N 11/02* (2006.01)
*F02N 15/06* (2006.01)
*F02N 15/02* (2006.01)
*F16F 15/26* (2006.01)

(52) U.S. Cl.
CPC ...... *F02N 11/0848* (2013.01); *F02N 11/0851* (2013.01); *F02N 15/062* (2013.01); F02N 11/00 (2013.01); F02N 11/0814 (2013.01); F02N 15/022 (2013.01); F02N 15/06 (2013.01); F02N 15/067 (2013.01); F16F 15/264 (2013.01)

(58) Field of Classification Search
USPC ............................. 123/179.1, 179.4, 179.25
See application file for complete search history.

(56) References Cited

U.S. PATENT DOCUMENTS

| | | | | |
|---|---|---|---|---|
| 5,012,686 | A | * | 5/1991 | Morishita ............. F02N 15/067 123/179.25 |
| 5,469,753 | A | * | 11/1995 | Vadin-Michaud .... F02N 15/067 290/48 |
| 6,868,815 | B2 | | 3/2005 | Carden |
| 7,859,150 | B2 | * | 12/2010 | Utsunomiya ......... F02N 15/067 310/75 R |
| 2002/0088290 | A1 | * | 7/2002 | Bowen .................... F16H 3/006 74/335 |
| 2003/0000492 | A1 | * | 1/2003 | Mori ......................... F02N 7/08 123/179.31 |
| 2004/0051320 | A1 | * | 3/2004 | Woernle ................. F02N 11/04 290/47 |
| 2004/0081553 | A1 | * | 4/2004 | Milana .................... F04D 25/14 415/121.2 |
| 2004/0250788 | A1 | | 12/2004 | Carden |
| 2004/0251072 | A1 | * | 12/2004 | Morii ..................... B62M 27/02 180/297 |
| 2005/0211216 | A1 | * | 9/2005 | Otsuki .................... F02B 75/34 123/185.3 |
| 2005/0229728 | A1 | * | 10/2005 | Otsuki .................... F02B 75/34 74/6 |
| 2012/0055447 | A1 | * | 3/2012 | Yano ....................... F02D 9/02 123/400 |
| 2016/0185335 | A1 | | 6/2016 | Namuduri et al. |

FOREIGN PATENT DOCUMENTS

| | | |
|---|---|---|
| JP | 2004-218697 A | 8/2004 |
| JP | 2004-245139 A | 9/2004 |
| JP | 2008-131801 A | 6/2008 |
| KR | 10-0589214 B1 | 6/2006 |
| KR | 10-2010-0028006 | 3/2010 |

* cited by examiner

MOTOR ASSEMBLY FOR STARTING ENGINE AND DRIVING BALANCE SHAFT AND METHOD OF CONTROLLING THE SAME

CROSS-REFERENCE TO RELATED APPLICATION

This application is a divisional application of non-provisional U.S. patent application Ser. No. 15/228,033, filed on Aug. 4, 2016, which claims priority to and the benefit of Korean Patent Application No. 10-2015-0142156, filed on Oct. 12, 2015, the entirety of each of which are incorporated herein by reference.

FIELD

The present disclosure relate to a motor assembly for starting an engine and driving a balance shaft, and a method of controlling the same.

BACKGROUND

The statements in this section merely provide background information related to the present disclosure and may not constitute prior art.

A balance shaft is a device for reducing vibration and noise generated by the reciprocating motion of a piston and the rotary motion of a crankshaft when an engine rotates. That is, the balance shaft rotates in a direction opposite to the crankshaft so as to cancel out vibration and noise generated by the rotary motion of the crankshaft. A mechanical balance shaft and a motor-driven balance shaft are used as examples of such a balance shaft.

Since the mechanical balance shaft is connected to the crankshaft of an engine by chains, gears, or the like, it is always driven regardless of an engine speed. However, the balance shaft requires a high engine speed equal to or higher than 4000 RPM, at which inertial force due to the reciprocating mass of the engine, e.g. a piston, is rapidly increased. For this reason, if the balance shaft is always driven, fuel efficiency may be very poor.

In order to address this issue, the motor-driven balance shaft, which is driven only in a high engine speed range by controlling the operation of a motor, is developed. However, the motor-driven balance shaft requires a separate motor, a motor control unit, and a power supply. For this reason, there is an issue in that the cost and weight of the balance shaft are increased and a separate space must be provided within an engine room.

In addition, since a starter motor for an ISG (Idle Stop and Go) system is used only to start or restart an engine, it is rarely utilized.

SUMMARY

The present disclosure provides a motor assembly for starting an engine and driving a balance shaft, in which a balance shaft for reducing inertial force due to reciprocating mass of an engine and a starter motor for performing an ISG (Idle Stop and Go) function are combined as a single system, and a method of controlling the same.

In one form of the present disclosure, a motor assembly for starting an engine and driving a balance shaft includes a motor (100) for rotating a motor shaft (110) which is axially movable, a clutch (200) attached to one end of the motor shaft (110) so as to transfer or block rotational force of the motor shaft (110), a balance shaft (300) rotated by the rotational force of the motor shaft (110) transferred through the clutch (200) so as to reduce vibration generated by an engine (1), a start gear (400) attached to the other end of the motor shaft (110); and an actuator (500) for axially moving the motor shaft (110) in a forward or backward direction.

The motor (100) may be a permanent magnetic AC motor with a vector control function.

The balance shaft (300) may not be connected to a crankshaft of the engine (1).

The actuator (500) may be a shift actuator.

The actuator (500) may axially move the motor shaft (110) in the forward or backward direction in order to simultaneously control forward or backward movement of the start gear (400) and disengagement or engagement of the clutch (200).

The motor assembly may further include a ring gear (600) engaged with the start gear (400) by the forward movement of the start gear (400) so as to transfer the rotational force of the motor shaft (110) to the engine (1).

The ring gear (600) may be arranged within a transmission (3).

In accordance with another form of the present disclosure, a method of controlling a motor assembly for starting an engine and driving a balance shaft includes determining whether it is desired to start or restart an engine (1) (S100), operating an actuator (500) such that a motor shaft (110) is moved forward (S200) when it is desired to start or restart the engine (1), and starting or restarting the engine by rotating a motor (100) and driving a start gear (400) (S300), after the operating an actuator (500) (S200).

In the operating an actuator (500) (S200), a clutch (200) may be disengaged while the start gear (400) is engaged with a ring gear (600).

The method may further include stopping operation of the actuator (500) such that the motor shaft (110) is moved backward (S400) when it is not desired to start or restart the engine (1).

In the stopping operation of the actuator (500) (S400), a clutch (200) may be engaged while the start gear (400) is disengaged from a ring gear (600).

The method may further include determining whether an RPM of the engine (1) is less than a predetermined target RPM (S500), after the stopping operation of the actuator (500) (S400).

The method may further include driving a balance shaft (300) by rotating the motor (100) (S600) when the RPM of the engine (1) is equal to or higher than the predetermined target RPM.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
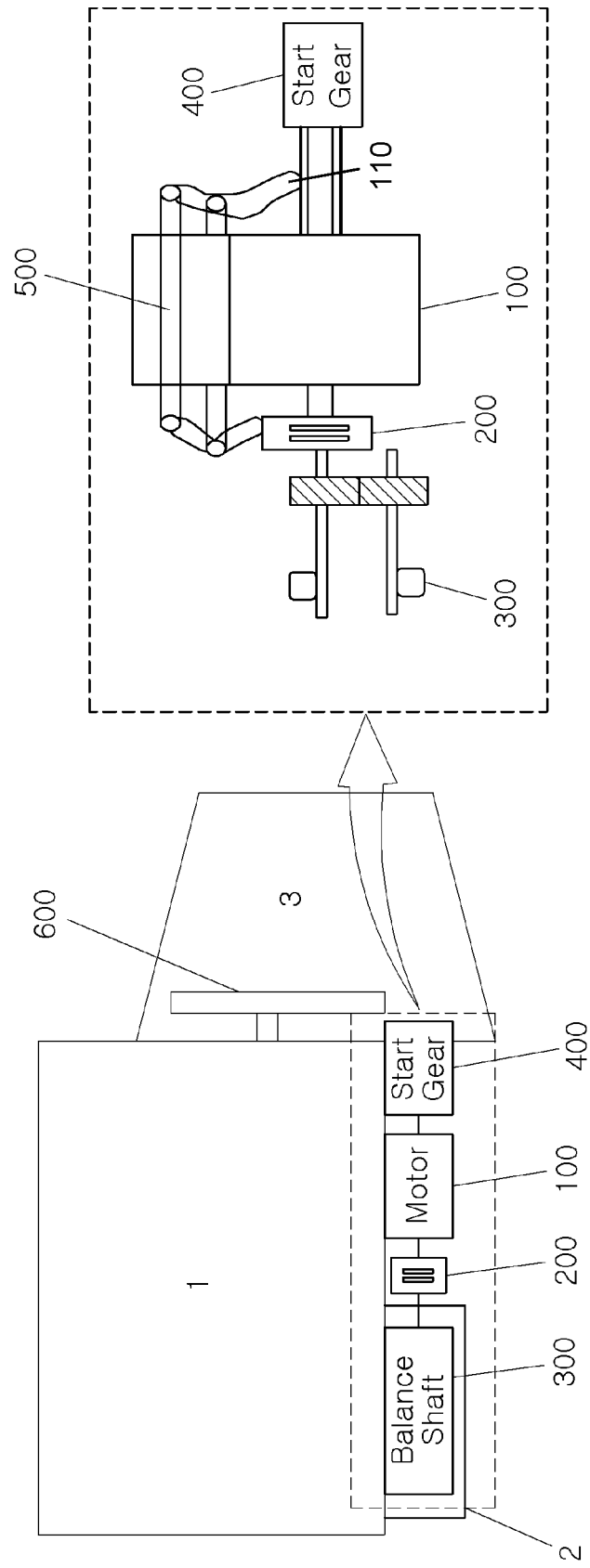
FIGS. 1A and 1B are block diagrams illustrating a motor assembly for starting an engine and driving a balance shaft according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

On the basis of the principle that the inventor can define the appropriate concept of a term in order to describe his/her own present disclosure in the best way, it should be construed as meaning and concepts for complying with the technical idea of the present disclosure. Accordingly, the forms described in the present specification and the construction shown in the drawings are nothing but one form of the present disclosure, and it does not cover all the technical ideas of the present disclosure. Thus, it should be understood that various changes and modifications may be made at the time of filing the present application. In addition, detailed descriptions of functions and constructions well known in the art may be omitted to avoid unnecessarily obscuring the gist of the present disclosure.

FIGS. 1A and 1B are block diagrams illustrating a motor assembly for starting an engine and driving a balance shaft according to one form of the present disclosure. Referring to FIGS. 1A and 1B, the motor assembly for starting an engine and driving a balance shaft includes: a motor 100, a clutch 200, a balance shaft 300, a start gear 400, an actuator 500, and a ring gear 600.

The motor 100 serves to rotate a motor shaft 110 which is axially movable. The balance shaft 300 may be rotated (driven) through the clutch 200 connected to one end of the motor shaft 110, and an engine 1 may be started through the start gear 400 connected to the other end of the motor shaft 110. In addition, the motor 100 may be a permanent magnetic AC motor with a vector control function. This enables the rotational speed and phase of the balance shaft 300 to be accurately controlled.

The clutch 200 is attached to one end of the motor shaft 110, and serves to transfer the rotational force of the motor shaft 110 to the balance shaft 300 or block the same.

The balance shaft 300 is rotated by the rotational force of the motor shaft 110 transferred through the clutch 200, and serves to reduce vibration generated by the engine 1. In addition, the balance shaft 300 may be disconnected from the crankshaft of the engine 1. That is, the balance shaft 300 may not be driven when the RPM of the engine 1 is less than a predetermined target RPM, unlike a conventional mechanical balance shaft which is connected to the crankshaft of an engine by chains, gears, or the like to be always driven regardless of an engine speed. Thus, the fuel efficiency of the vehicle can be improved.

The start gear 400 may be attached to the other end of the motor shaft 110. In addition, the start gear 400 may be engaged with or disengaged from the ring gear 600.

The ring gear 600 is engaged with the start gear 400 by the forward movement of the start gear 400, so as to transfer the rotational force of the motor shaft 110 to the engine 1. In addition, the ring gear 600 may be arranged within a transmission 3.

The actuator 500 serves to axially move the motor shaft 110 in a forward or backward direction. In addition, the actuator 500 may be a shift actuator (especially, a bidirectional shift fork actuator). The actuator 500 axially moves the motor shaft 110 in the forward or backward direction, so as to simultaneously control the forward or backward movement of the start gear 400 and the disengagement or engagement of the clutch 200. That is, when the actuator 500 is operated, the motor shaft 110 is axially moved forward, and thus the start gear 400 is also moved forward while the clutch 200 is disengaged. In addition, when the operation of the actuator 500 is stopped, the motor shaft 110 is axially moved backward (i.e. the motor shaft 110 is returned to the original state), and thus the start gear 400 is also moved backward while the clutch 200 is engaged.

Figure 2:
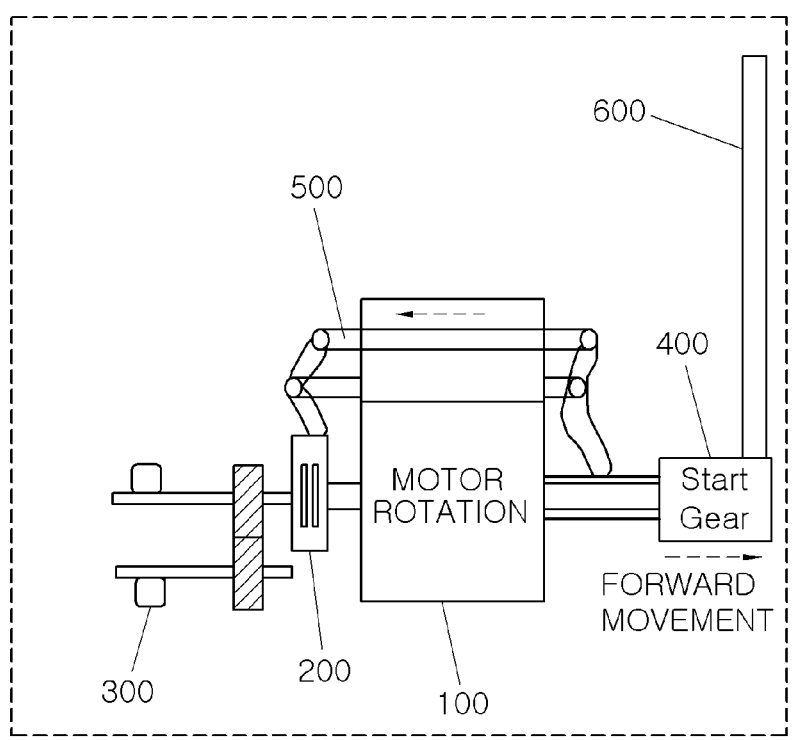
FIGS. 2 to 4 are views illustrating the operational state of the motor assembly for starting an engine and driving a balance shaft.
Figure 3:
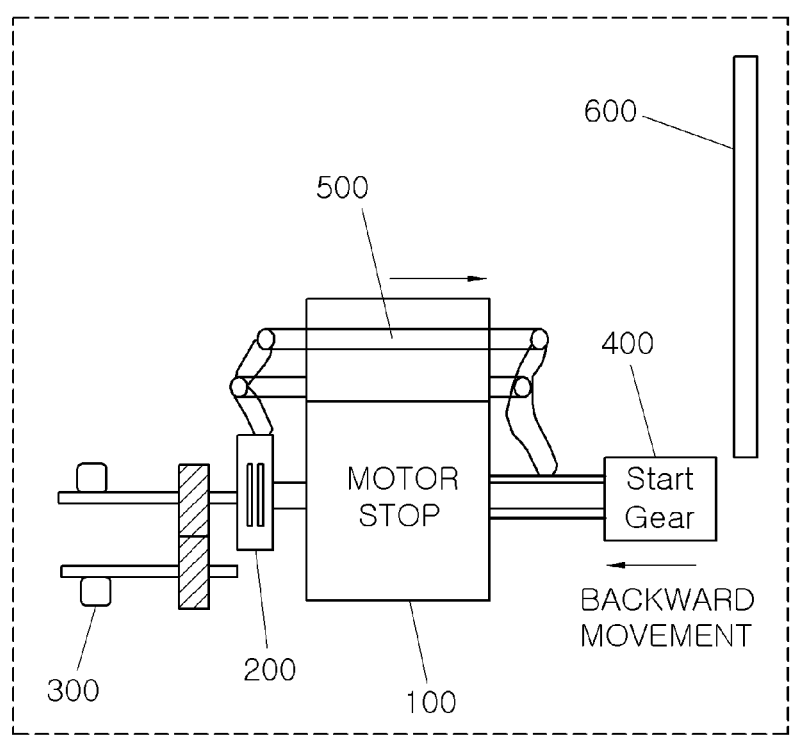
Figure 4:
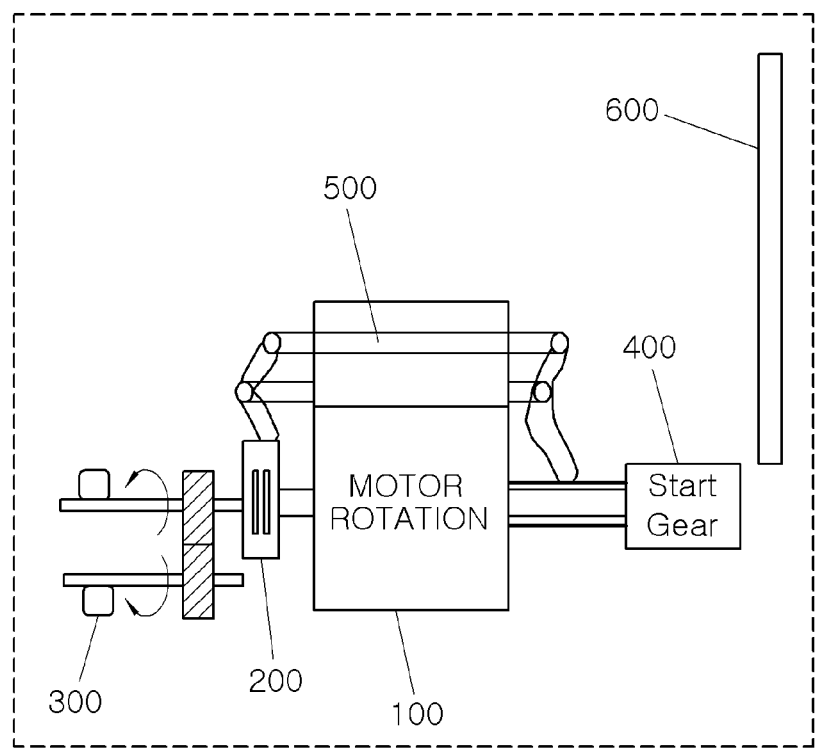

FIGS. 2 to 4 are views illustrating the operational state of the motor assembly for starting an engine and driving a balance shaft according to the form of the present disclosure. Referring to FIG. 2, when the engine is intended to be started or restarted, the actuator 500 is first operated such that the motor shaft 110 is moved forward. Thus, the start gear 400 is engaged with the ring gear 600 while the clutch 200 is disengaged. The rotational force of the motor 100 is then transferred to the ring gear 600 so that the engine 1 is started or restarted.

Referring to FIG. 3, when the RPM of the engine 1 is less than a predetermined target RPM, the actuator 500 is operated such that the motor shaft 110 is moved backward. Thus, the start gear 400 is disengaged from the ring gear 600 while the clutch 200 is engaged. At the same time, the motor 100 is stopped, and thus both of the ring gear 600 and the balance shaft 300 are not driven.

Referring to FIG. 4, even when the RPM of the engine 1 is equal to or higher than the predetermined target RPM, the actuator 500 is operated such that the motor shaft 110 is moved backward. Thus, the start gear 400 is disengaged from the ring gear 600 while the clutch 200 is engaged. The motor 100 is then rotated, and the rotational force of the motor 100 is transferred to the balance shaft 300 through the clutch 200 so as to drive the balance shaft 300.

Figure 5:
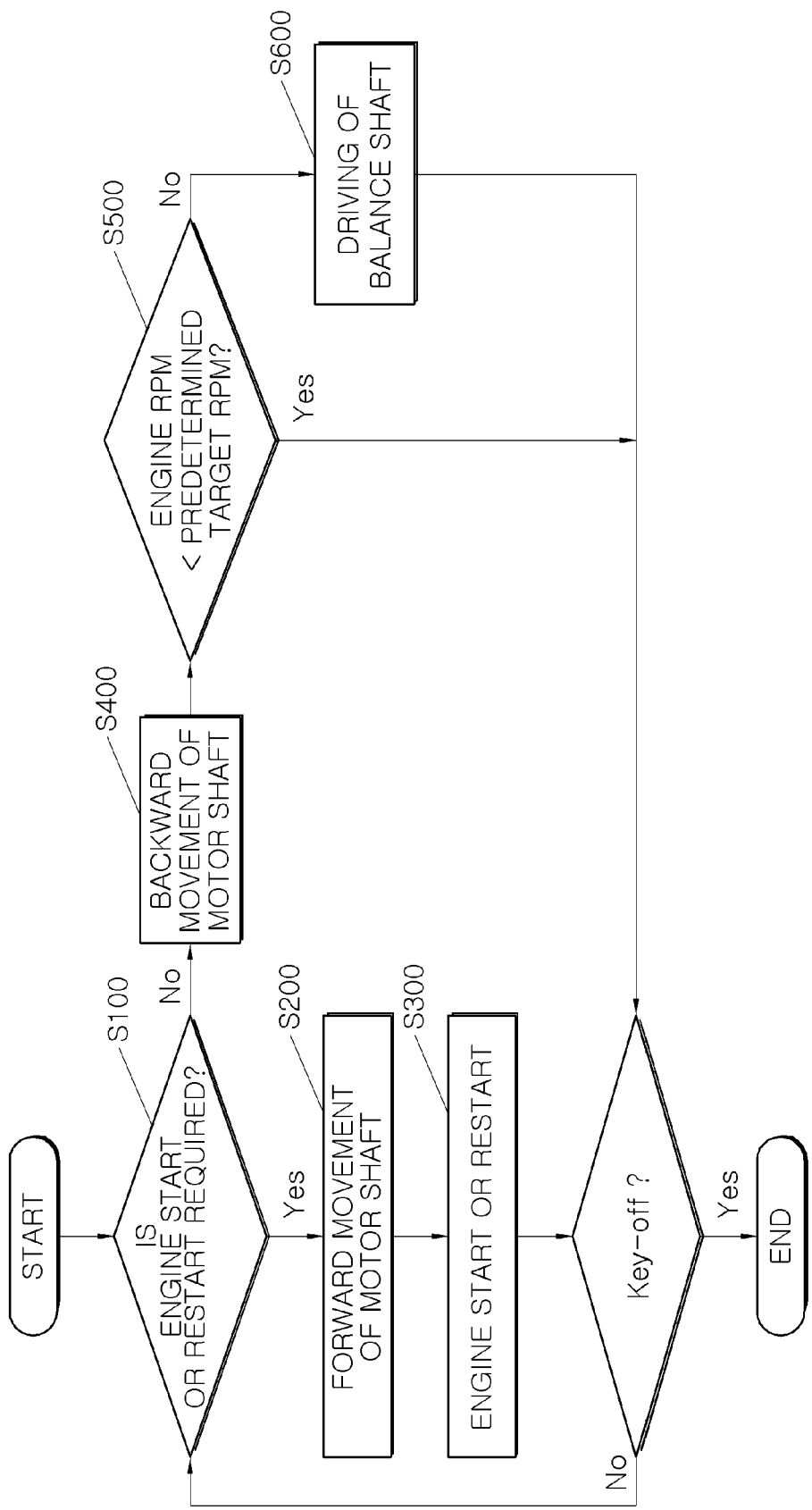
FIG. 5 is a flowchart illustrating a method of controlling a motor assembly for starting an engine and driving a balance shaft according to another form of the present disclosure.

FIG. 5 is a flowchart illustrating a method of controlling a motor assembly for starting an engine and driving a balance shaft according to another form of the present disclosure. Referring to FIG. 5, the method of controlling a motor assembly for starting an engine and driving a balance shaft includes: a first determination step of determining whether it is desired to start or restart an engine 1 (S100); a first operation step of operating an actuator 500 such that a motor shaft 110 is moved forward (S200) when it is desired to start or restart the engine 1; and an engine start or restart step of rotating a motor 100 rotates to drive a start gear 400 (S300) after the first operation step (S200). In step S200, a clutch 200 is disengaged while the start gear 400 is engaged with a ring gear 600 (see FIG. 2).

That is, an ISG system serves as a starter motor in order for the engine 1 to start or restart. In this case, since the RPM of the engine 1 is not high, it is not desired to drive a balance shaft 300. Accordingly, in order to block the rotational force of a motor 100 from being transferred to the balance shaft 300, the clutch 200 is disengaged. Therefore, it is possible to inhibit or prevent undesired energy consumption and improve the fuel efficiency of a vehicle.

The method of controlling a motor assembly for starting an engine and driving a balance shaft includes a second operation step of stopping the operation of the actuator 500 such that the motor shaft 110 is moved backward (S400) when it is not desired to start or restart the engine 1. In step S400, the clutch 200 is engaged while the start gear 400 is disengaged from the ring gear 600 (see FIGS. 3 and 4).

That is, since the engine 1 is not required to start or restart, the ISG system is prepared to serve as a motor for driving the balance shaft 300, instead of serving as a starter motor. In this case, since the unbalanced weight of the balance shaft 300 is always directed downward by gravity, the rotational angular phase of the unbalanced weight is constant when the clutch 200 is engaged. Therefore, it is possible to stably control an anti-phase relative to the unbalanced force of the engine.

The method of controlling a motor assembly for starting an engine and driving a balance shaft may include a second determination step of determining whether the RPM of the engine 1 is less than the predetermined target RPM (S500) after the second operation step (S400). In addition, the method may include a step of driving the balance shaft 300 by rotating the motor 100 (S600) when the RPM of the engine 1 is equal to or higher than the predetermined target RPM (see FIG. 4).

That is, when the RPM of the engine 1 is equal to or higher than the predetermined target RPM, the balance shaft 300 is driven in order to cancel out the unbalanced inertia force of the engine. In this case, the predetermined target RPM may be set to be different according to the type of vehicle (e.g. the predetermined target RPM may be set as 3500 RPM).

On the other hand, when the RPM of the engine 1 is less than the predetermined target RPM, the motor 100 is stopped, and thus the balance shaft 300 is also stopped. In this case, since the noise (e.g., booming noise) and vibration of the vehicle are not great enough, there is no need to drive the balance shaft 300. Therefore, it is possible to inhibit or prevent undesired energy consumption and improve the fuel efficiency of the vehicle (see FIG. 3).

In accordance with the exemplary forms of the present disclosure, since a separate motor for driving a balance shaft is removed from a motor assembly, it is possible to reduce the cost and weight of a vehicle.

When an engine RPM is low, the driving of the balance shaft is stopped so that fuel efficiency can be improved. On the other hand, when the engine RPM is high, the balance shaft is driven so that excellent NVH (Noise, Vibration, and Harshness) performance can be maintained.

While the present disclosure has been described with respect to the specific forms, it will be apparent to those skilled in the art that various changes and modifications may be made without departing from the spirit and scope of the present disclosure as defined in the following claims.

What is claimed is:

1. A method of controlling a motor assembly for starting an engine and driving a balance shaft, comprising:
   determining whether starting or restarting of an engine is desired;
   operating an actuator such that a motor shaft is moved forward when the starting or restarting of the engine is desired;
   starting or restarting the engine by rotating a motor and by driving a start gear, after the operating the actuator;
   stopping the operation of the actuator such that the motor shaft is moved backward when the starting or restarting of the engine is undesired;
   after the stopping operation of the actuator, determining whether an RPM of the engine is less than a predetermined target RPM; and
   driving a balance shaft by rotating the motor when the RPM of the engine is equal to or higher than the predetermined target RPM.

2. The method of claim 1, wherein, in the operating the actuator, a clutch is disengaged while the start gear is engaged with a ring gear.

3. The method of claim 1, wherein, in the stopping operation of the actuator, a clutch is engaged while the start gear is disengaged from a ring gear.

* * * * *